United States Patent [19]

Berfield

[11] Patent Number: 6,037,685
[45] Date of Patent: Mar. 14, 2000

[54] THERMAL PROTECTION APPARATUS FOR ELECTRIC MOTORS

[75] Inventor: Robert C. Berfield, Jersey Shore, Pa.

[73] Assignee: Shop-Vac Corporation, Williamsport, Pa.

[21] Appl. No.: 09/249,518

[22] Filed: Feb. 12, 1999

[51] Int. Cl.[7] .............................. H02K 5/14; H02H 5/04
[52] U.S. Cl. .................. 310/68 C; 310/245; 310/242
[58] Field of Search ................... 310/43, 238, 68 C, 310/68 R, 67 R, 66, 236, 239, 242, 245, 247; 29/596, 597, 598; 361/25, 26, 27, 24, 23

[56] References Cited

U.S. PATENT DOCUMENTS

| | | | |
|---|---|---|---|
| 841,849 | 1/1907 | Cook | 310/83 |
| 1,744,508 | 1/1930 | Sayre | 310/83 |
| 2,381,982 | 8/1945 | Nardone | 171/324 |
| 2,767,285 | 10/1956 | Kosak, Jr. | 200/142 |
| 2,844,782 | 7/1958 | Wentworth | 318/472 |
| 3,600,633 | 8/1971 | Bellis | 317/13 R |
| 3,872,415 | 3/1975 | Clarke | 337/140 |
| 4,034,265 | 7/1977 | DuRocher et al. | 361/25 |
| 4,230,961 | 10/1980 | Calfo et al. | 310/68 R |
| 4,499,517 | 2/1985 | Lisauskas | 361/24 |
| 4,564,775 | 1/1986 | Mazzorana | 310/62 |
| 4,658,321 | 4/1987 | Lindner | 361/25 |
| 4,789,800 | 12/1988 | Zimmermann | 310/68 |
| 4,823,035 | 4/1989 | Kudla et al. | 310/68 C |
| 4,897,584 | 1/1990 | Grützmacher et al. | 318/471 |
| 4,914,329 | 4/1990 | Ottersbach | 310/68 |
| 5,168,415 | 12/1992 | Osuga | 361/28 |
| 5,221,914 | 6/1993 | Ubukata et al. | 337/13 |
| 5,311,615 | 5/1994 | Couetoux | 388/836 |
| 5,734,219 | 3/1998 | Horski et al. | 310/240 |

FOREIGN PATENT DOCUMENTS

| | | |
|---|---|---|
| 279007 | 6/1987 | European Pat. Off. . |
| 138298 | 7/1985 | Japan . |
| 296746 | 12/1987 | Japan . |
| 177282 | 7/1990 | Japan . |
| 300705 | 11/1993 | Japan . |

Primary Examiner—Thomas M. Dougherty
Assistant Examiner—Tran N Nguyen
Attorney, Agent, or Firm—Marshall, O'Toole, Gerstein, Murray & Borun

[57] ABSTRACT

A thermal protection mechanism for electric motors is disclosed. A brush is urged into electrical contact with a commutator by a primary brush spring. A thermally deformable fastener releasably secures the primary brush spring to a brush housing. A secondary brush spring urges the brush away from the commutator with a force less than that of the primary spring. A thermal overload condition within the motor causes the thermally deformable fastener to substantially deform so that the force exerted on the brush by the primary spring is substantially reduced. The force exerted by the secondary spring overcomes the primary spring so that the brush is forcefully disengaged from electrical contact with the commutator, thereby terminating operation of the motor.

24 Claims, 2 Drawing Sheets

THERMAL PROTECTION APPARATUS FOR ELECTRIC MOTORS

TECHNICAL FIELD

The present invention relates generally to electric motors, and more particularly, to a thermally responsive protection apparatus for such a motor.

BACKGROUND ART

Electric motors often include mechanisms that terminate operation of the motor in response to thermal overload conditions that could result in permanent damage to the motor or associated equipment. A thermal overload, such as an excessively high winding or rotor temperature, may occur as a result of a locked rotor, a high mechanical load, a supply overvoltage, a high ambient temperature, or some combination of these conditions.

Conventional thermal overload protection mechanisms are based on a thermally responsive switch or relay that interrupts the flow of electrical power to the motor when the temperature of the motor winding or other motor component reaches a predetermined elevated temperature. One typical approach uses a bimetallic switching element that is thermally coupled to the motor. The bimetallic element may comprise one of a pair of electrical contacts so that electrical currents supplied to the motor are conducted directly through the element. Alternatively, the bimetallic element may actuate or control an auxiliary pair of electrical contacts that carry power to the motor. In either event, under thermal overload conditions, the bimetallic element interrupts the electrical connection supplying power to the motor.

Another known approach uses shape memory alloy beams or springs to disengage the motor brushes from the commutator. In this approach, a shape memory alloy element returns to a "memorized" or undistorted condition in response to a high temperature condition. This reversible memory effect is used to lift the brushes away from the commutator to interrupt operation of the motor in response to a thermal overload, and returns the brushes into contact with the commutator once the temperature within the motor has fallen below a predetermined threshold.

The known approaches described above have several significant drawbacks. First, these approaches are all designed to provide multiple switching events and are self-resetting. Thus, a thermal overload condition resulting from a locked rotor condition, for example, may cause continuous limit cycling around the thermal overload condition as long as the locked rotor condition persists. Such repetitive cycles up to the thermal limit of the motor may cause damage or substantially reduce the useful operating life thereof. Second, the self-resetting switches described above may become less reliable in providing protection due to wear and fatigue caused by repetitive flexing. Finally, the self-resetting approaches discussed above are complex, consume a significant amount of space within a motor, are difficult to assemble, and are costly.

SUMMARY OF THE INVENTION

In accordance with one aspect of the present invention, a thermally deformable fastener releasably secures a primary brush spring to a brush housing. The primary spring urges the brush into electrical contact with a commutator. A thermal overload condition in the motor causes the thermally deformable fastener to soften and substantially deform so that the brush is no longer urged into electrical contact with the commutator.

In accordance with another aspect of the present invention, a thermally deformable fastener releasably secures a primary brush spring to a brush housing. The primary spring urges the brush into electrical contact with a commutator. A secondary spring urges the brush away from the commutator with a second force less than the force exerted by the primary spring. A thermal overload condition in the motor causes the fastener to soften and substantially deform so that the force exerted by the primary spring is reduced to a level less than the force exerted by the secondary spring, thereby forcefully disengaging the brush from the commutator.

In accordance with another aspect of the present invention, a primary spring is mounted to a brush housing and urges a brush into electrical contact with a commutator with a first force. A secondary spring is releasably secured to the brush housing with a thermally deformable fastener. In operation, the thermally deformable fastener deforms so that the secondary spring urges the brush away from the commutator with a second force greater than the first force.

The invention itself, together with further objects and attendant advantages, will best be understood by reference to the following detailed description, taken in conjunction with the accompanying drawings.

DESCRIPTION OF THE PREFERRED EMBODIMENTS

Figure 1:
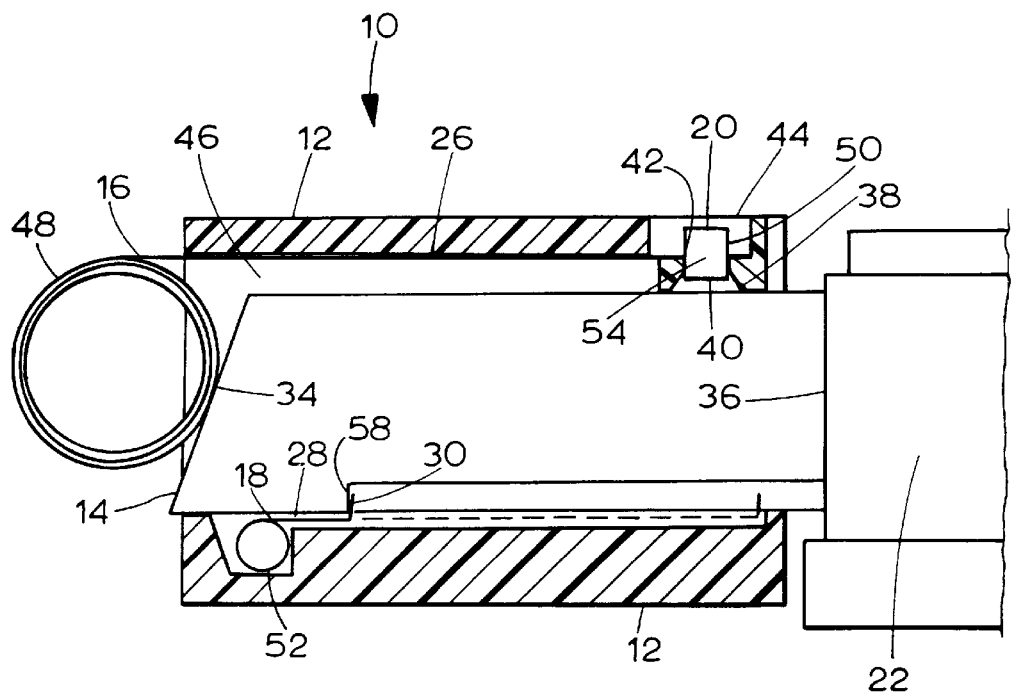
FIG. 1 is an elevational view, partially in section, of an embodiment of the present invention.
Figure 2:
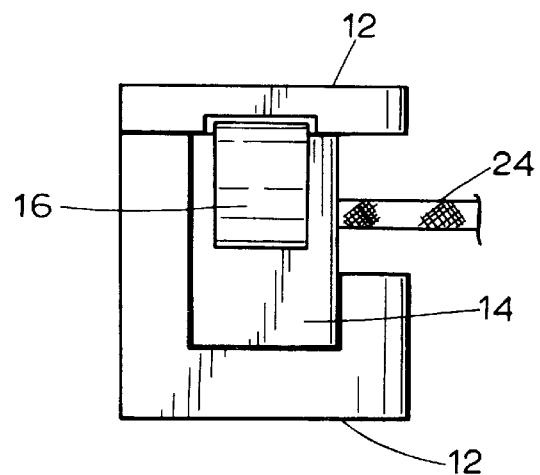
FIG. 2 is a rear elevational view, partially in section, of the embodiment of FIG. 1.

Illustrated in FIGS. 1 and 2 is a thermal protection mechanism 10 for an electric motor that embodies aspects of the present invention. The thermal protection mechanism 10 comprises a brush housing 12, a brush 14, a primary spring 16, a secondary spring 18, and a thermally deformable fastener 20 all preferably arranged as shown.

The brush 14 is slidably disposed within the brush housing 12 and is urged by the primary spring 16 into electrical contact with an electric motor commutator 22. The primary spring 16 is secured to the housing 12 by the thermally deformable fastener 20. The secondary spring 18 urges the brush away from the commutator 22 with a force less than that of the primary spring 16 so that, under normal operating conditions, an electrical path exists between the commutator 22 and a brush shunt 24 (shown in FIG. 2) that is attached to the brush 14.

The brush 14 is preferably made of a conductive carbon material, and has an elongated profile with a beveled outer end 34 and an inner end 36 adapted to make electrical contact with the commutator 22. The inner end 36 of the brush 14 is preferably concave or cupped with a curvature radius that substantially matches the curvature radius of the commutator 22.

The brush 14 is slidably disposed with the housing 12. The housing 12 is preferably made from an electrically non-conductive material such as a thermoplastic. Alternatively, an electrically conductive housing may be used in combination with an electrically insulating coating, liner, or other similar structure interposed between the brush and the housing 12. In any case, the housing 12 forms a channel or cavity 46 that guides the brush 14 toward the commutator 22. The housing 12 further serves to maintain the inner end 36 of the brush 14 in alignment with the commutator 22. Thus, the housing 12 feeds the brush 14 towards the commutator 22 as the brush wears, and maintains the inner end 36 in substantial alignment with the commutator 22 as the commutator 22 rotates.

The primary spring 16 is preferably a constant force or roll-type spring that has a coiled portion 48 and an unrolled segment portion 26. The primary spring 16 applies a substantially constant force against the outer end 34 of the brush 14 perpendicular to the axis of the coiled portion 48 and directed along the length of the brush 14 toward the commutator 22. As the brush 14 wears, its length is reduced and the coiled portion 48 moves towards the commutator, thereby recoiling a portion of unrolled segment 26. In this way, the primary spring 16 maintains a substantially constant force against the outer surface 34 of the brush 14 independent of the length of the brush 14.

The thermally deformable fastener 20 secures the unrolled segment 26 to the housing 12. The housing 12 includes a recess 44 and a mounting hole 38. The unrolled segment 26 has an opening 42 that is aligned with the mounting hole 38 in the housing 12. The thermally deformable fastener 20 is preferably shaped as a pin or a cylinder having a head portion 50, a body portion 54, and a tail portion 40. The body portion 54 passes through the opening 42 and the mounting hole 38. The body portion 54 engages with the opening 42 in the unrolled segment 26 to securely fasten the unrolled segment 26 to the housing 12. The tail portion 40 and the head portion 50 may be thermally deformed during initial assembly to prevent the pin portion 54 from backing out of the mounting hole 38. For example, a heat-staking operation may be used to "mushroom" the tail portion 40 so that its deformed state will not allow it to pass through the relatively smaller mounting hole 38. Additionally, the head portion 50 may be "mushroomed" so that the unrolled segment 26 is sandwiched between "mushrooms" formed at the head portion 50 and the tail portion 40.

The fastener 20 is preferably made from a thermoplastic material having a melting point above the normal operating temperature of the motor, but below an abnormal operating temperature encountered during, for example, an overload condition.

The secondary spring 18 is preferably (although not necessarily) a constant force or roll spring having a coiled portion 18, an unrolled segment portion 28, and tab portion 30. The coiled portion 52 of the secondary spring 18 is captured in a retaining recess 56. The tab 30 is engaged with a shouldered portion 58 and urges the brush 14 away from the commutator 22 by exerting a force against the shouldered portion 58. The force exerted by the secondary spring 18 urging the brush 14 away from the commutator is less than the force with which the primary spring 16 urges the brush 14 toward the commutator 22.

Thus, under normal operating conditions the primary spring 16 overcomes the secondary spring 18 and urges the inner end 36 of the brush 14 into electrical contact with the commutator 22. Consequently, electrical power is transferred via the brush shunt 24 to the brush 14 and to the commutator 22, thereby allowing the motor to operate. In response to a thermal overload condition within the motor, the fastener 20 softens and the unrolled portion 26 of the primary spring 16 cuts through the body portion 54 of the fastener 20. If the elevated temperature is high enough, and persists for a sufficient time, the unrolled segment will cut completely through the body portion 54 of the fastener 20, thereby releasing the spring 16 from the housing and substantially reducing to zero the force exerted by the coiled portion 48 against the brush 14. The brush 14 then moves under the influence of the secondary spring 18 to the left, as seen in FIG. 1, out of contact with the commutator 22, thereby disabling the motor.

Those of ordinary skill in the art will immediately recognize that a variety of other configurations and materials may be used for the fastener 20 without departing from the spirit of the invention. For example, the fastener 20 may be a plastic rivet or plug that sandwiches the unrolled segment 26 between a head portion and the housing 12. Alternatively, the fastener 20 may be a threaded screw or bolt that threads into the housing 12, a Christmas tree-shaped plug, or a clip style fastener. In addition, the fastener 20 may be made from a variety of materials other than a thermoplastic. For example, metals having a low melting point such as lead or lead alloys could be used to achieve similar results.

The fastener 20 could alternatively be designed to deform without completely severing as discussed above. For example, the fastener 20 could incorporate a mechanical stop made from a material that does not substantially soften in response to a typical thermal overload condition within the motor. Thus, in response to a thermal overload condition, the unrolled segment portion 26 cuts through the softened portion of the fastener 20 to reduce the force exerted on the brush 14, but stops once it encountered the hard stop material.

Those skilled in the art will recognize that the primary spring 16 and the secondary spring 18 may be of the same or different types. For example, the primary spring 16 may be a constant force spring while the secondary spring may be a helical spring. Alternatively, a number of suitable spring types may be substituted in a variety of combinations for the primary spring 16 and the secondary spring 18 without departing from the spirit of the invention.

Those skilled in the art will also recognize that the secondary spring 18 could be eliminated without departing from the spirit of the invention. While the secondary spring 18 adds a measurable improvement by providing a more positive disengagement of the brush 14 from the commutator 22, it is not essential to operation of the protection mechanism 10. Release of the primary spring 16 from the housing 12 reduces the force urging the brush 14 into electrical contact with the commutator 22 to substantially zero. Furthermore, rotation of the commutator 22 tends to push the inner end 36 of the brush 14 away from the commutator 22. Thus, even without the secondary spring 18 in place, the electrical path between the brush shunt 24 and the commutator 22 is broken, or at least seriously impaired, when the fastener 20 releases the primary spring from the housing 12 in response to a thermal overload condition within the motor.

Figure 3:
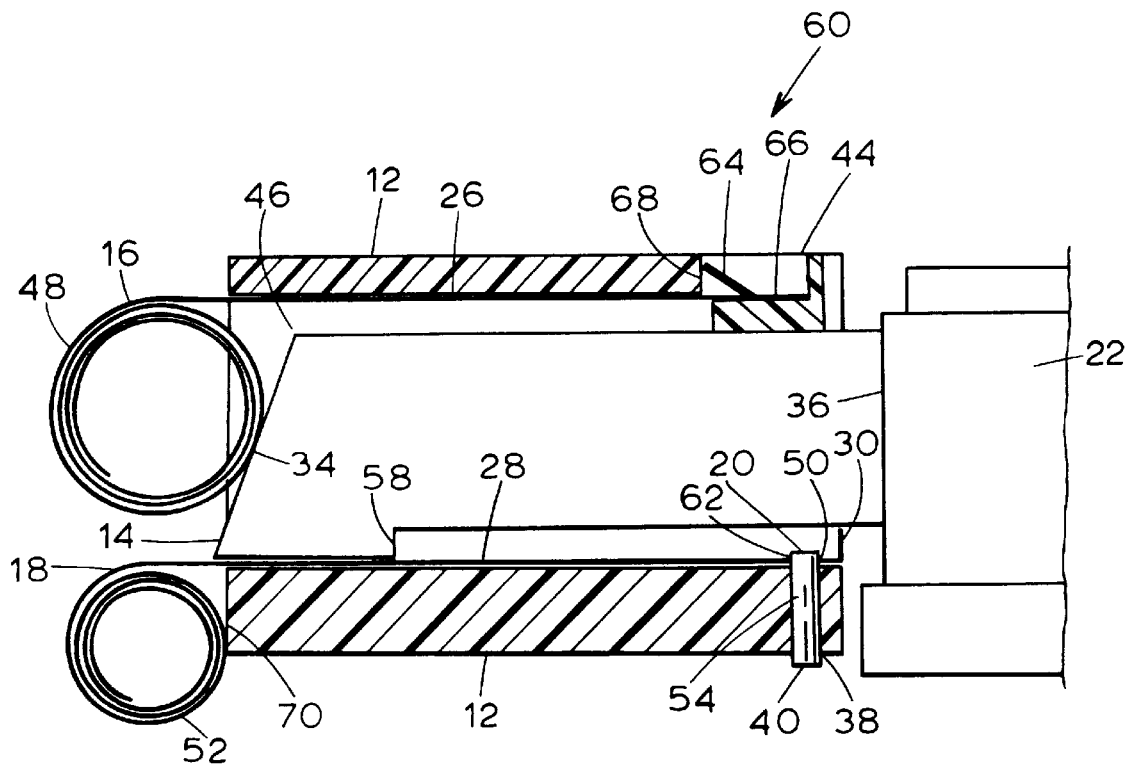
FIG. 3 is an elevational view, partially in section, of an alternative embodiment of the present invention.
Figure 4:
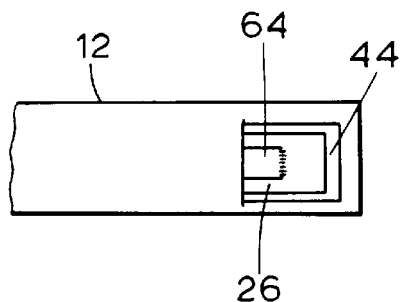
FIG. 4 is a fragmentary plan view of a portion of the embodiment of FIG. 3.

FIGS. 3 and 4 illustrate an alternative embodiment 60 of the present invention that includes many of the elements used in the thermal protection mechanism 10 shown in FIGS. 1 and 2. In the embodiment shown in FIG. 3, a mounting tab 64 permanently secures the primary spring 16 to the housing. The mounting tab 64 projects upwardly from a surface 66 of the unrolled portion 26 and is stopped against a face 68 of the recess 44. The mounting tab 64 may be formed directly from the material of the unrolled portion 26. For example, the unrolled portion 26 may be stamped using conventional techniques to produce a rectangular-shaped portion that is bent upwardly as shown in FIG. 3. The coiled portion 48 of the primary spring 16 urges the inner end 36 of the brush 14 against the commutator 22 and additionally forces the tab 64 against the face 68 in the recess 44.

In the alternative embodiment 60, the thermally deformable fastener 20 secures the unrolled portion 28 of the secondary spring 18 to the housing 12 so that the tab 30 is spaced from the shouldered portion 58 of the brush 14. The body portion 54 of the fastener 20 passes through an opening 62 and the mounting hole 38. The body portion 54 engages with the opening 62 in the unrolled segment 28 to securely fasten the unrolled segment 28 of the secondary spring 18 to the housing 12. In contrast to the embodiment shown in FIGS. 1 and 2, the coil portion 52 of the secondary spring 18 applies a force against a face 70 of the housing 12 that exceeds the force with which the primary spring 16 urges the brush 14 toward the commutator 22.

Thus, in response to a thermal overload condition within the motor, the unrolled portion 28 of the secondary spring 18 cuts through the body portion 54 of the fastener 20, thereby allowing the unrolled portion 28 to retract towards the coil portion 52. As the unrolled portion 28 retracts, the tab portion 30 engages with the shouldered portion 58 of the brush 14 and urges the brush out of contact with the commutator 22, thereby disabling the motor.

As with the embodiment of FIG. 1, the head portion 50 and/or tail portion 40 of the fastener 20 may be deformed using various secondary operations (e.g., heat staking) to prevent the pin portion 54 from backing out of the mounting hole 38. Also, the aforementioned alternative pin materials and configurations may similarly be used with this embodiment without departing from the scope of the invention.

Of course, it should be understood that a range of changes and modifications can be made to the embodiments described above. It is therefore intended that the foregoing detailed description be regarded as illustrative rather than limiting and that it be understood that it is the following claims, including all equivalents, which are intended to define the scope of this invention.

What is claimed is:

1. A protection apparatus for an electric motor having a brush and a commutator, comprising:
    a housing in which the brush is disposed;
    a primary spring mounted to the housing and urging the brush against the commutator;
    a secondary spring; and
    a thermally deformable fastener releasably securing one of the primary and secondary springs to the housing, the fastener being responsive to a high temperature condition in the motor to cause the fastener to deform so that the secondary spring urges the brush away from the commutator.

2. The protection apparatus of claim 1, wherein the thermally deformable fastener is made of a plastic material.

3. The protection apparatus of claim 1, wherein the primary spring urges the brush towards the commutator with a substantially constant force as wear of the brush occurs.

4. The protection apparatus of claim 1, wherein the brush has a length extending between an inner end adapted to engage the commutator and an outer end, and wherein the primary spring comprises a coil with an axis substantially perpendicular to the length of the brush.

5. The protection apparatus of claim 1, wherein the secondary spring has an unrolled segment, and wherein the thermally deformable fastener releasably fastens the unrolled segment to the housing.

6. The protection apparatus of claim 1, wherein the secondary spring is a constant force spring.

7. A protection apparatus for an electric motor having a brush and a commutator, comprising:
    a housing in which the brush is disposed;
    a primary spring urging the brush into electrical contact with the commutator; and
    a thermally deformable fastener thermally coupled to the housing and adapted to releasably secure the primary spring to the housing,
    whereby an undesirable thermal condition within the motor causes the thermally deformable fastener to release the primary spring from the housing so that it no longer urges the brush into electrical contact with the commutator.

8. The protection apparatus of claim 7, wherein the thermally deformable fastener is made of a plastic material.

9. The protection apparatus of claim 7, wherein the primary spring urges the brush towards the commutator with a substantially constant force as wear of the brush occurs.

10. The protection apparatus of claim 7, wherein the brush has a length extending between an inner end adapted to engage the commutator and an outer end, and wherein the primary spring comprises a coil with an axis substantially perpendicular to the length of the brush.

11. The protection apparatus of claim 7, wherein, the primary spring has an unrolled segment and wherein the thermally deformable fastener releasably fastens the unrolled segment to the housing.

12. The protection apparatus of claim 7 further comprising a secondary spring mounted to the housing and adapted to urge the brush away from electrical contact with the commutator.

13. The protection apparatus of claim 12, wherein the primary spring urges the brush toward the commutator with a first force and the secondary spring urges the brush away from the commutator with a second force less than the first force.

14. The protection apparatus of claim 12, wherein the secondary spring urges the brush away from the commutator with a substantially constant force as the brush wears.

15. The protection apparatus of claim 12, wherein the reduced force exerted by the primary spring is less than the force exerted by the secondary spring.

16. A protection apparatus for an electric motor having a brush and a commutator, comprising:
    a housing in which the brush is disposed;
    a primary spring; and
    a thermally deformable fastener releasably securing the primary spring such that the spring exerts a force on the brush to urge the brush against the commutator, the fastener being responsive to a high temperature condition in the motor to cause the fastener to deform so that the force exerted by the primary spring on the brush is reduced.

17. The protection apparatus of claim 16, wherein the thermally deformable fastener is made of a plastic material.

18. The protection apparatus of claim 16, wherein the primary spring urges the brush towards the commutator with a substantially constant force as wear of the brush occurs.

19. The protection apparatus of claim 16, wherein the brush has a length extending between an inner end adapted to engage the commutator and an outer end, and wherein the primary spring comprises a coil with an axis substantially perpendicular to the length of the brush.

20. The protection apparatus of claim 16, wherein the primary spring has an unrolled segment, and wherein the thermally deformable fastener releasably fastens the unrolled segment to the housing.

21. The protection apparatus of claim 16 further comprising a secondary spring mounted to the housing and adapted to urge the brush away from electrical contact with the commutator.

22. The protection apparatus of claim 21, wherein the primary spring urges the brush toward the commutator with a first force and the secondary spring urges the brush away from the commutator with a second force less than the first force.

23. The protection apparatus of claim 21, wherein the secondary spring urges the brush away from the commutator with a substantially constant force as the brush wears.

24. The protection apparatus of claim 21, wherein the reduced force exerted by the primary spring is less than the force exerted by the secondary spring.

* * * * *